United States Patent
Takahashi

(10) Patent No.: US 10,503,335 B2
(45) Date of Patent: Dec. 10, 2019

(54) CURRENT-DRIVEN DISPLAY PANEL AND PANEL DISPLAY DEVICE ADAPTED TO TOUCH SENSING

(71) Applicant: SYNAPTICS INCORPORATED, San Jose, CA (US)

(72) Inventor: Seiki Takahashi, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 43 days.

(21) Appl. No.: 15/922,239

(22) Filed: Mar. 15, 2018

(65) Prior Publication Data

US 2018/0275795 A1    Sep. 27, 2018

(30) Foreign Application Priority Data

Mar. 24, 2017    (JP) .................... 2017-058348

(51) Int. Cl.
  *G06F 3/044*    (2006.01)
  *G06F 3/047*    (2006.01)
  *G06F 3/041*    (2006.01)

(52) U.S. Cl.
  CPC .............. *G06F 3/044* (2013.01); *G06F 3/047* (2013.01); *G06F 3/0412* (2013.01); *G06F 2203/04112* (2013.01); *G09G 2310/0264* (2013.01)

(58) Field of Classification Search
  CPC . G06F 2203/04112; G06F 2203/04103; G06F 3/0412; G06F 3/0416; G06F 3/044; G06F 3/047; G09G 2310/0264
  See application file for complete search history.

(56) References Cited

U.S. PATENT DOCUMENTS

| 8,427,435 B2 | 4/2013 | Takahashi et al. |
| 2016/0241139 A1* | 8/2016 | Yao ........................ G06F 1/3262 |
| 2016/0320898 A1* | 11/2016 | Tang .................... G09G 3/3655 |
| 2017/0269773 A1* | 9/2017 | Suzuki ................. G06F 3/0416 |

OTHER PUBLICATIONS

Takahashi et al. "Embedded Liquid Crystal Capacitive Touch Screen Technology for Large Size LCD applications", SID Symposium Digest, pp. 563-566, 2009.
Park et al. "High-Speed AMOLED Pixel Circuit and Driving Scheme", SID Symposium Digest, pp. 806-809.

* cited by examiner

*Primary Examiner* — Muhammad N Edun
(74) *Attorney, Agent, or Firm* — Patterson + Sheridan, LLP

(57) ABSTRACT

A display panel includes a plurality of pixel circuits; and a sense line. The plurality of pixel circuits includes a touch sensing-adapted pixel circuit including a current-driven element, a drive transistor; a hold capacitor configured to hold a voltage corresponding to a data voltage and a sense capacitor. A capacitance of the sense capacitor varies in response to contact of an object with the current-driven display panel in a vicinity of the touch sensing-adapted pixel circuit. The drive transistor is configured to supply a current to the current-driven element in response to the data voltage and supply a sense current to the sense line in response to the capacitance of the sense capacitor.

20 Claims, 11 Drawing Sheets

CURRENT-DRIVEN DISPLAY PANEL AND PANEL DISPLAY DEVICE ADAPTED TO TOUCH SENSING

CROSS REFERENCE

This application claims priority to Japanese Patent Application No. 2017-058348, filed on Mar. 24, 2017, the disclosure of which is incorporated herein by reference in its entirety.

TECHNICAL FIELD

The present disclosure relates to a current-driven display panel and a panel display device, more particularly, to touch sensing onto a current-driven display panel which incorporates current-driven elements in the respective pixel circuits.

BACKGROUND

Recent panel display devices are often configured to be adapted to touch sensing, which involves sensing a contact of an object such as human fingers onto the display panel. A display panel adapted to touch sensing can be used as an input-output device by itself and this effectively improves user-friendliness. The "touch sensing" referred to herein includes sensing the position at which an object is placed into contact with the display panel, and may further include detecting the contact pressure.

A panel display device, especially when used in a portable terminal, is often designed to reduce the volume thereof. To fulfill this expectation, techniques using common electrodes, which are connected only to capacitive loads, as sense electrodes for touch sensing have been proposed with respect to liquid crystal display panels. It should be noted that the common electrodes are often referred to as counter electrodes instead. Use of common electrodes as sense electrodes for touch sensing allows achieving touch sensing without provision of a touch panel separately from the liquid crystal display panel.

In contrast, a display panel which uses current-driven elements in the respective pixel circuits, such as OLED (organic light emitting diode) display panels, is not adapted to touch sensing through this approach, because this type of display panel does not include common electrodes connected only to capacitive loads. One alternative approach is to additionally incorporate sensing elements for touch sensing within a current-driven display panel such as OLED display panels.

A current-driven display panel is designed to reduce the numbers of circuit elements, such as thin film transistors. The reduction of the number of additional circuit elements and routing traces contributes facilitation of design and manufacture process. There is a technical need for reduction of the number of circuit and routing traces elements additionally incorporated to achieve touch sensing.

U.S. Pat. No. 8,427,435 and Takahashi et al. "Embedded Liquid Crystal Capacitive Touch Screen Technology for Large Size LCD applications", SID Symposium Digest, pp. 563-566, 2009 disclose techniques for integrating touch sensors including sensor capacitors in a liquid crystal display panel.

Park et al. "High-Speed AMOLED Pixel Circuit and Driving Scheme", SID Symposium Digest, pp. 806-809 discloses configurations of pixel circuits of OLED display panels, more particularly, a 6T1C-type pixel circuit and a 5T1C-type pixel circuit.

SUMMARY

In one embodiment, a display panel includes a plurality of pixel circuits and a sense line. The plurality of pixel circuits include a touch sensing-adapted pixel circuit. The touch sensing-adapted pixel circuit includes a current-driven element, a drive transistor, a hold capacitor holding a voltage corresponding to a data voltage, and a sense capacitor. A capacitance of the sense capacitor varies in response to a contact of an object with the current-driven display panel in a vicinity of the touch sensing-adapted pixel circuit. The drive transistor is configured to supply a current to the current-driven element in response to the data voltage, and to supply a sense current to the sense line in response to the capacitance of the sense capacitor.

In another embodiment, a panel display device comprises a display driver and a display panel. The display panel comprises a plurality of pixel circuits and a sense line. The plurality of pixel circuits comprise a touch sensing-adapted pixel circuit. The touch sensing-adapted pixel circuit comprises a current-driven element, a drive transistor, a hold capacitor configured to hold a voltage corresponding to a data voltage, and a sense capacitor. A capacitance of the sense capacitor varies in response to contact of an object with the current-driven display panel in a vicinity of the touch sensing-adapted pixel circuit. The drive transistor is configured to supply a current to the current-driven element in response to the data voltage and supply a sense current to the sense line in response to the capacitance of the sense capacitor. The display driver is configured to generate the data voltage and receive the sense current.

In another embodiment, a method comprises, by a drive transistor integrated in a pixel circuit of a display panel, supplying a drive current to a current-driven element integrated in the pixel circuit in response to a voltage held across a hold capacitor integrated in a pixel circuit. The method further comprises by the drive transistor, supplying a sense current to a sense line in response to a capacitance of a sense capacitor. The capacitance of the sense capacitor varies in response to contact of an object with the display panel in a vicinity of the pixel circuit.

DETAILED DESCRIPTION

Embodiments of the present disclosure will be described below with reference to the attached drawings.

First Embodiment

Figure 1:
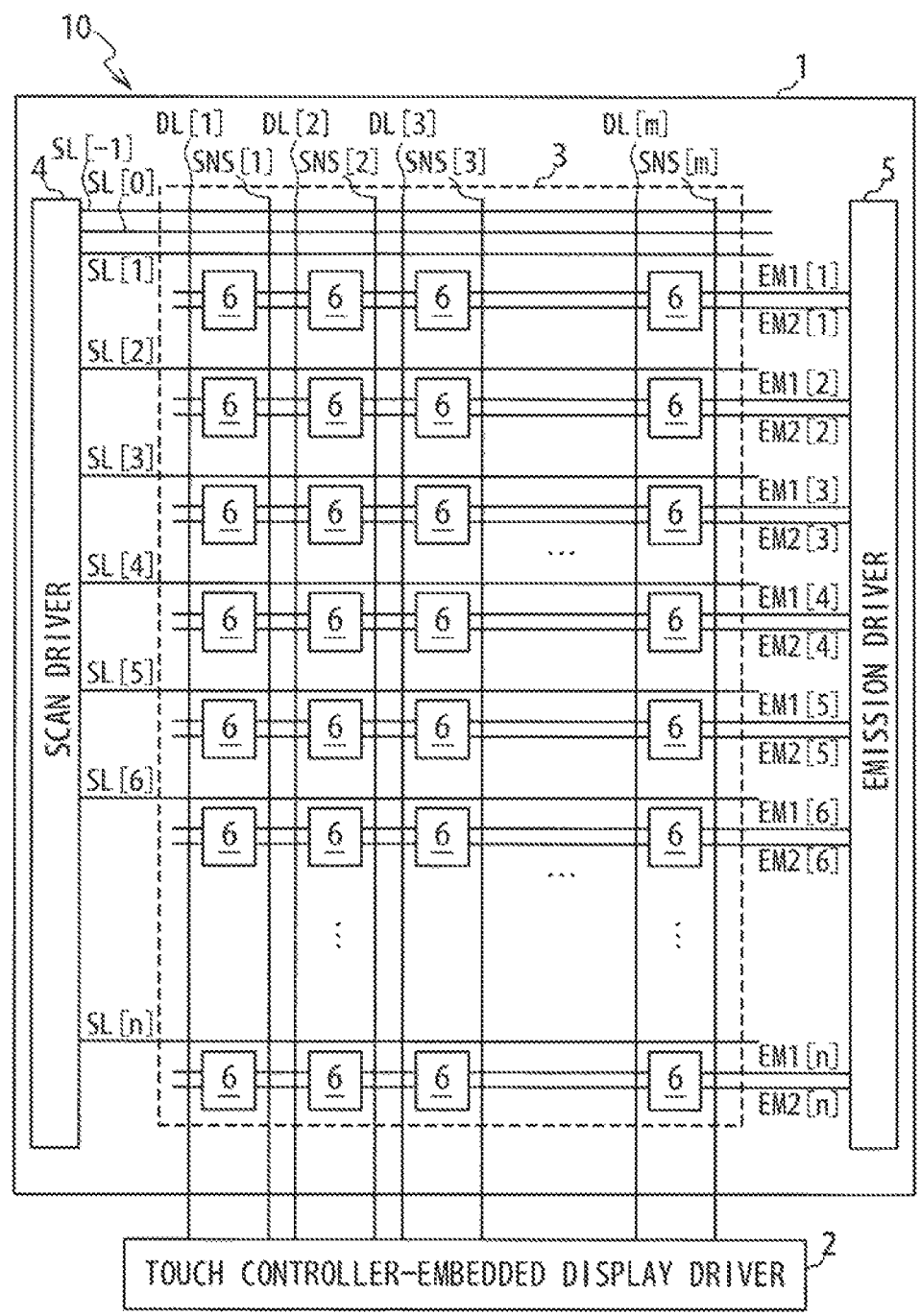
FIG. 1 is a block diagram illustrating the configuration of a panel display device in a first embodiment.

FIG. 1 is a block diagram illustrating the configuration of a panel display device 10 in a first embodiment. The panel display device 10 includes an OLED display panel 1 and a touch controller-embedded display driver 2. The touch controller-embedded display driver 2 has the function of driving the OLED display panel 1 and also performing touch sensing onto the OLED display panel 1.

In this embodiment, the OLED display panel 1 is configured as a current-driven display panel adapted to voltage programming. The OLED display panel 1 includes a display region 3, a scan driver 4 and an emission driver 5. Arranged in the display region 3 are pixel circuits 6 arrayed in rows and columns, scan lines SL[−1] to SL[n], first emission lines EM1[1] to EM1[$n$], second emission lines EM2[1] to EM2[$n$], data lines DL[1] to DL[m] and sense lines SNS[1] to SNS[m]. The scan driver 4 drives the scan lines SL[−1] to SL[n], and the emission driver 5 drives the first emission lines EM1[1] to EM1[$n$] and the second emission lines EM2[1] to EM2[$n$]. The scan driver 4 and the emission driver 5 may be integrated in the OLED display panel 1 by using a SOG (system on glass) technology.

Each pixel circuit 6 is configured to display red (R), green (G) or blue (B) by using an OLED element. In one embodiment, each pixel circuit 6 may include an OLED element which emits light of red (R), green (G) or blue (B). In an alternative embodiment, each pixel circuit 6 may be configured to include an OLED element which emits white light and display red (R), green (G) or blue (B) by using a color filter of red (R), green (G) or blue (B). A pixel circuit 6 displaying red is used as an R subpixel. Similarly, a pixel circuit 6 displaying green is used as a G subpixel and a pixel circuit 6 displaying blue is used as a B subpixel. Additionally, each pixel circuit 6 is adapted to touch sensing, and includes a sense capacitor used for touch sensing.

Figure 2:
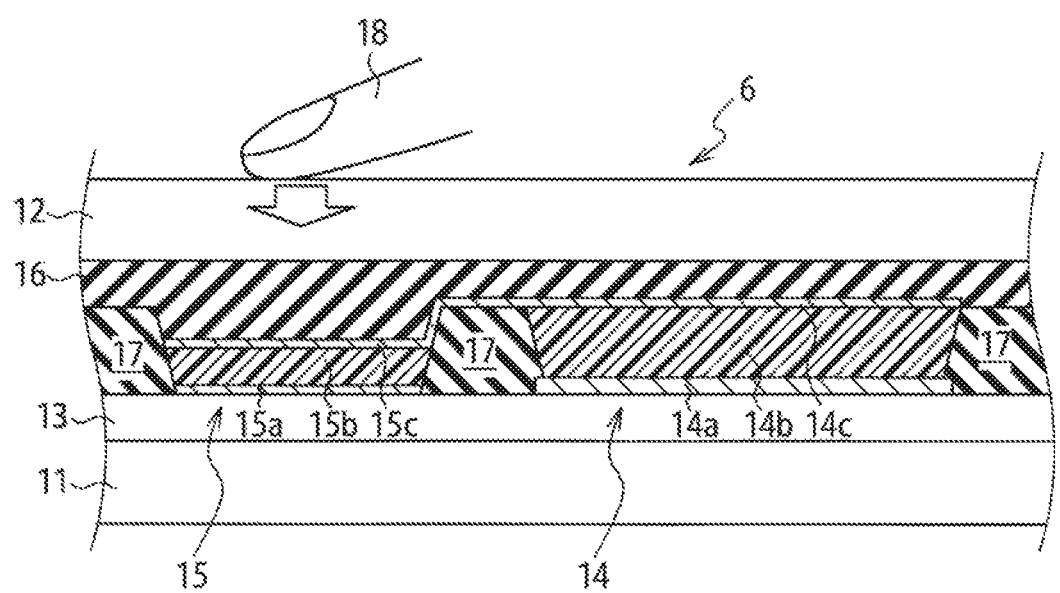
FIG. 2 is a section view schematically illustrating the structure of a pixel circuit of an OLED display panel in the first embodiment.

FIG. 2 is a section view schematically illustrating the structure of each pixel circuit 6 of the OLED display panel 1. The OLED display panel 1 includes a lower glass substrate 11 and an upper glass substrate 12. Formed between the lower glass substrate 11 and the upper glass substrate 12 are a circuit integration layer 13, OLED elements 14 (one illustrated), sense capacitors 15 (one illustrated) and a passivation layer 16. In the circuit integration layer 13, thin film transistors of the respective pixel circuits 6, the scan lines SL[−1] to SL[n], the first emission lines EM1[1] to EM1[$n$], the second emission lines EM2[1] to EM2[$n$], the data lines DL[1] to DL[m], the sense lines SNS[1] to SNS[m] and a passivation layer covering the same. The OLED elements 14 and the sense capacitors 15 are formed on the upper surface of the circuit integration layer 13. Each OLED element 14 includes an anode 14$a$, a light emitting layer 14$b$ and a cathode 14$c$. Each sense capacitor 15 includes a lower electrode 15$a$, a dielectric layer 15$b$ and an upper electrode 15$c$. The cathode 14$c$ and the upper electrode 15$c$ may be separated, although FIG. 2 illustrates the structure in which the cathode 14$c$ and the upper electrode 15$c$ are connected. Each OLED element 14 and each sense capacitor 15 are separated from other OLED elements 14 and other sense capacitors 15 by a spacer 17. The passivation layer 16 is formed to cover the OELD elements 14 and the sense capacitors 15.

A sense capacitor 15 is used to generate a sense signal for touch sensing. When the upper glass substrate 12 is pressed by an object such as a human finger 18 in the vicinity of the sense capacitor 15, the sense capacitor 15 is slightly deformed and the distance between the lower and upper electrodes 15$a$ and 15$c$ varies in at least a portion of the sense capacitor 15. The variation in the distance between the lower and upper electrodes 15$a$ and 15$c$ causes a variation in the capacitance of the sense capacitor 15. This variation in the capacitance of the sense capacitor 15 depends on the pressure applied to the OLED display panel 1 in the vicinity of the sense capacitor 15. As described later in detail, each pixel circuit 6 is configured to generate a sense current Isens having a current level dependent on variations in the capacitance of the sense capacitor 15. To enhance the deformation of the sense capacitor 15, the dielectric layer 15$b$ may be formed of organic dielectric material having elasticity.

Referring back to FIG. 1, the scan lines SL[−1]-SL[n], the first emission lines EM1[1]-EM1[$n$] and the second emission lines EM2[1]-EM2[$n$] are disposed to extend in the horizontal direction of the OLED display panel 1, in which the rows of the pixel circuits 6 are extended. The scan lines SL[−1] to SL[n] are used for selection of rows of pixel circuits 6 to be reset, selection of rows of pixel circuits 6 from which sense signals are to be obtained, and selection of rows of pixel circuits 6 into which data voltages are to be written. The first emission lines EM1[1] to EM1[$n$] and the second emission lines EM2[1] to EM2[$n$] are used for selection of rows of pixel circuits 6 in which the OLED elements 14 are allowed to emit light. The OLED display panel 1 includes two additional scan lines SL[−1] and SL[0] in addition to the scan lines SL[1] to SL[n], which are respectively associated with the rows of the pixel circuits 6, in the configuration illustrated in FIG. 1. These two additional scan lines SL[−1] and SL[0] are used for selection of rows of pixel circuits 6 to be reset and selection of rows of pixel circuits 6 from which sense signals are to be obtained, with respect to the topmost two rows of the pixel circuits 6.

The data lines DL[1] to DL[m] and the sense lines SNS[1] to SNS[m] are disposed to extend in the vertical direction, in which the columns of the pixel circuits 6 are extended. The data lines DL[1] to DL[m] are used to supply data voltages to the respective pixel circuits 6. The sense lines SNS[1] to SNS[m] are used to output the sense currents Isens generated in touch sensing from the respective pixel circuits 6, as described later.

The touch controller-embedded display driver 2 supplies data voltages to the data lines DL[1] to DL[m] in response to externally supplied image data, for example, from an application processor, and thereby writes the data voltages into the respective pixel circuits 6 via the data lines DL[1] to DL[m]. Additionally, the touch controller-embedded display driver 2 also has the function of detecting the current levels of the sense currents Isens obtained from the respective pixel circuits 6 to achieve touch sensing. The touch controller-embedded display driver 2 outputs touch sensing data indicative of the result of the touch sensing. In one embodiment, the touch controller-embedded display driver 2 may be mounted on the OLED display panel 1 by using a surface mounting technique.

Figure 3:
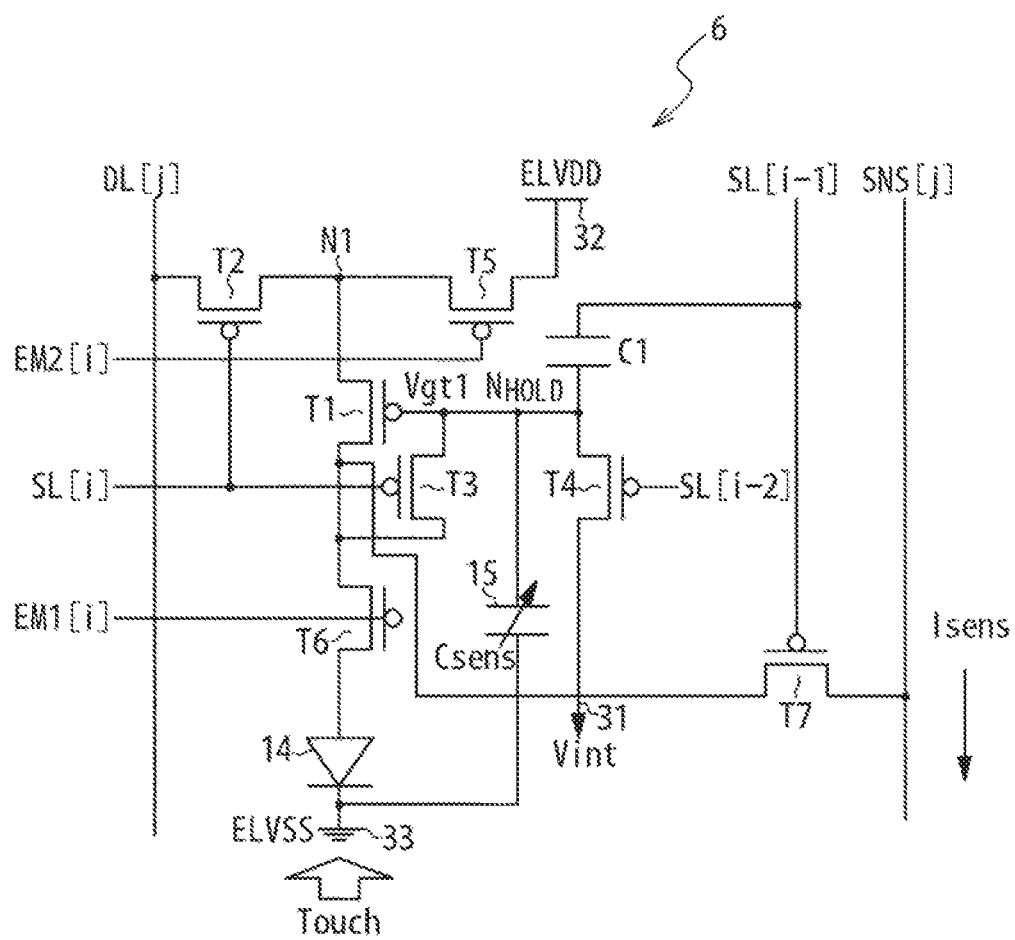
FIG. 3 is a circuit diagram illustrating the circuit configuration of the pixel circuit in the first embodiment.

FIG. 3 is a circuit diagram illustrating the circuit configuration of a pixel circuit 6 in the first embodiment. Although FIG. 3 illustrates the configuration of the pixel circuit 6 positioned in the $i^{th}$ row and the $j^{th}$ column, a skilled person would appreciate other pixel circuits 6 are also configured as illustrated in FIG. 3. The scan line SL[i] is a scan line which is activated in horizontal sync periods in which data voltages are written into the pixel circuits 6 positioned in the $i^{th}$ row. Similarly, the scan line SL[i−1] is a scan line which is activated in horizontal sync periods in which data voltages are written into the pixel circuits 6 positioned in the $(i-1)^{th}$ row, and the scan line SL[i−2] is a scan line which is activated in horizontal sync periods in which data voltages are written into the pixel circuits 6 positioned in the $(i-2)^{th}$ row.

In the first embodiment, each pixel circuit 6 includes a drive transistor T1, a select transistor T2, a threshold voltage compensation transistor T3, a reset transistor T4, select transistors T5, T6, T7 and a hold capacitor C1, in addition to the above-described OLED element 14 and sense capacitor 15. In this embodiment, all of the drive transistor T1, the select transistor T2, the threshold voltage compensation transistor T3, the reset transistor T4, the select transistors T5, T6 and T7 are all configured as a P-type MOS transistor.

The drive transistor T1 generates a drive current depending on the data voltage written into each pixel circuit 6 and supplies the generated drive current to the OLED element 14. The drive transistor T1 has a source connected to the node N1 and a gate connected to a hold node $N_{HOLD}$.

The select transistor T2 of each pixel circuit 6 is used to select whether a data voltage is to be written into the pixel circuit 6. The select transistor T2 has a source connected to the data line DL[j], a drain connected to the node N1 and a gate connected to the scan line SL[i]. The select transistor T2 is configured to electrically connect the data line DL[j] to the node N1, that is, the source of the drive transistor T1, in response to the potential of the scan line SL[i].

The threshold voltage compensation transistor T3 has a source connected to the drain of the drive transistor T1, a drain connected to the gate of the drive transistor T1 and a gate connected to the scan line SL[i]. The threshold voltage compensation transistor T3 is configured to electrically connect the drain and source of the drive transistor T1 in response to the potential on the scan line SL[i].

The reset transistor T4 are used to reset the hold capacitor C1 and the sense capacitor 15 by electrically connecting the hold node $N_{HOLD}$ to an internal power line 31 in response to the potential on the scan line SL[i−2]. In this embodiment, the reset transistor T4 has a source connected to the hold node $N_{HOLD}$, a drain connected to the internal power line 31 and a gate connected to the scan line SL[i−2]. The internal power line 31 is fixed to a potential Vint.

The select transistors T5 and T6 are used to select whether the OLED element 14 in the pixel circuit 6 is allowed to emit light. In detail, the select transistor T5 has a source connected to a power line 32, a drain connected to the node N1 and a gate connected to the second emission line EM2[i]. The power line 32 is supplied with a power supply voltage ELVDD used to drive the OLED element 14. The select transistor T5 is configured to electrically connect the power line 32 to the node N1, that is, the source of the drive transistor T1, in response to the potential on the second emission line EM2[i]. The select transistor T6 has a source connected to the drain of the drive transistor T1, a drain connected to the anode of the OLED element 14 and a gate connected to the first emission line EM1[i]. The select transistor T6 is configured to electrically connect the drain of the drive transistor T1 to the anode of the OLED element 14 in response to the potential on the first emission line EM1[i].

The select transistor T7 is used to select whether a sense current Isens is to be obtained from the pixel circuit 6. The select transistor T7 has a source connected to the drain of the drive transistor T1, a drain connected to the sense line SNS[j] and a gate connected to the scan line SL[i−1]. The select transistor T7 is configured to electrically connect the drain of the drive transistor T1 to the sense line SNS[j] in response to the potential on the scan line SL[i−1].

The hold capacitor C1 holds a data voltage corresponding to the grayscale level specified for the pixel circuit 6, that is, the brightness level with which the OLED element 14 emits light. The hold capacitor C1 is connected between the hold node $N_{HOLD}$ and the scan line SL[i−1].

The OLED element 14 has an anode connected to the drain of the select transistor T6 and a cathode connected to a circuit ground line 33. The circuit ground line 33 is a power line fixed to the circuit ground level ELVSS.

The sense capacitor 15 is used to generate a sense signal for touch sensing as described above. The sense capacitor 15 is connected between the hold node $N_{HOLD}$ and the circuit ground line 33.

The configuration of the pixel circuit 6 illustrated in FIG. 3 is such that the select transistor T7, the second emission line EM2, the sense capacitor 15 and the sense line SNS are additionally incorporated in a so-called 6T1C-type pixel circuit. In the configuration illustrated in FIG. 3, some of circuit elements and routing traces used to drive the OLED element 14 are also used to generate the sense signal for touch sensing. This effectively reduces the number of circuit elements and routing traces additionally incorporated in the pixel circuit 6 for achieving touch sensing.

More specifically, the drive transistor T1, which supplies a drive current to the OLED element 14 depending on the data voltage, is also used as an amplifying transistor which generates a sense current Isens, which is used for touch sensing, in response to the capacitance of the sense capacitor 15.

Additionally, the reset transistor T4, which is used to reset the hold capacitor C1, is also used to reset the sense capacitor 15. In detail, in the pixel circuit 6 illustrated in FIG. 3, one terminal of the hold capacitor C1 and one terminal of the sense capacitor 15 are commonly connected to the hold node $N_{HOLD}$, that is, the gate of the drive transistor T1, and the reset transistor T4 is configured to electrically connect the hold node $N_{HOLD}$ to the internal power line 31 in response to the potential on the scan line SL[i−2]. This configuration allows one reset transistor T4 to reset both of the hold capacitor C1 and the sense capacitor 15.

Furthermore, the hold capacitor C1, which holds the data voltage, is also used as a reference capacitor in the generation of the sense current Isens.

As thus described, the configuration of the pixel circuit 6 in this embodiment allows reducing the number of circuit elements and routing traces additionally incorporated to achieve touch sensing by using some of circuit elements for both of the drive of the OLED element 14 and the generation of the sense current Isens.

Figure 4:
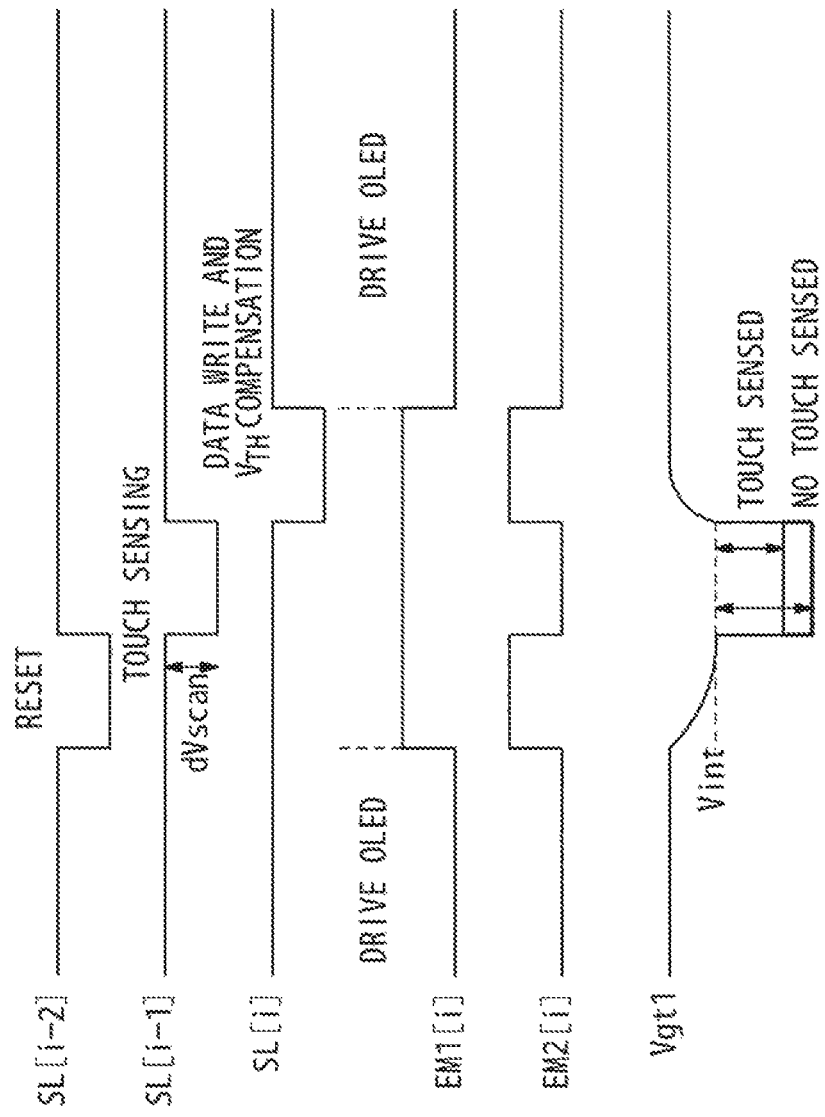
FIG. 4 is a timing chart illustrating the operation of the pixel circuit illustrated in FIG. 3.

FIG. 4 is a timing chart illustrating an exemplary operation of the pixel circuit 6 illustrated in FIG. 3, which is positioned in the $i^{th}$ row and the $j^{th}$ column. In this embodiment, the scan lines SL[i−2] to SL[i], the first emission line EM1[i] and second emission line EM2[i] are all low-active. In an initial state, the scan lines SL[i−2], SL[i−1] and SL[i] are deactivated, and the first emission line EM1[i] and the second emission line EM2[i] are activated.

The operation of the pixel circuit 6 illustrated in FIG. 4 includes a reset operation, a touch sensing operation, a data write operation and a drive operation of the OLED element 14.

In the reset operation, the scan line SL[i−2] is activated and the first emission line EM1[i] and the second emission line EM2[i] are deactivated. Note that the scan line SL[i−2] is a scan line which is activated when data voltages are written into the pixel circuits 6 in the (i−2)$^{th}$ row. This turns on the reset transistor T4 to reset the potential on the hold node N$_{HOLD}$, that is, the gate potential Vgt1 of the drive transistor T1, to the potential Vint.

The touch sensing operation is then performed after the reset operation. In the touch sensing operation, the scan line SL[i−2] is deactivated and the scan line SL[i−1] is activated. Since the scan line SL[i−1] is low-active as described above and the hold node N$_{HOLD}$ is connected to the scan line SL[i−1] via the hold capacitor C1, the potential of the hold node N$_{HOLD}$, that is, the gate potential Vgt1 of the drive transistor T1 is lowered by the pull-down of scan line SL[i−1].

The variation dVsens in the gate potential Vgt1 of the drive transistor T1 upon the activation of the scan line SL[i−1] is dependent on the capacitance Csens of the sense capacitor 15 and represented by the following expression (1):

$$dVens = \frac{dVscan \times C1}{(Csens + C1)} \quad (1)$$

where dVscan is the variation in the potential on the scan line SL[i−1] upon the activation of the scan line SL[i−1], that is, the pull-down of the scan line SL[i−1]. This implies the gate potential Vgt1 of the drive transistor T1 upon the activation of the scan line SL[i−1] depends on the capacitance Csens of the sense capacitor 15.

The capacitance Csens of the sense capacitor 15 depends on contact of an object, such as a human finger, with the OLED display panel 1 in the vicinity of the relevant pixel circuit 6, and accordingly the gate potential Vgt1 of the drive transistor T1 depends on the contact of the object with the OLED display panel 1. When an object is in contact with the OLED display panel 1 in the vicinity of the relevant pixel circuit 6, this reduces the thickness of the dielectric layer 15b of the sense capacitor 15 and thereby increases the capacitance Csens of the sense capacitor 15. When the sense capacitance Csens of the sense capacitor 15 is increased, the variation dVsens in the gate potential Vgt1 is made relatively small, as indicated by the legend "TOUCH SENSED" in FIG. 4. In contrast, when no object is in contact with the OLED display panel 1 in the vicinity of the relevant pixel circuit 6, the capacitance Csens of the sense capacitor 15 is reduced, and the variation dVsens in the gate potential Vgt1 is made relatively large, as indicated by the legend "NO TOUCH SENSED" in FIG. 4.

The second emission line EM2[i] is activated in synchronization with the activation of the scan line SL[i−1]. This provides a current path through which the sense current Isens flows from the power line 32 to the sense line SNS[j] via the select transistor T5, the drive transistor T1 and the select transistor T7. The sense current Isens obtained from the pixel circuit 6 depends on contact of an object, such as a human finger, with the OLED display panel 1 in the vicinity of the pixel circuit 6, since the sense current Isens depends on the gate potential Vgt1 of the drive transistor T1. Accordingly, it is possible to sense contact of an object with the OLED display panel 1 in the vicinity of the pixel circuit 6 by detecting the sense current Isens by the touch controller-embedded display driver 2.

It is also possible to detect the pressure applied to the OLED display panel 1 by the object through detecting the sense current Isens, since the capacitance Csens of the sense capacitor 15 depends on the pressure applied to the sense capacitor 15, that is, the pressure applied to the OLED display panel 1 in the vicinity of the sense capacitor 15. When the pressure applied to the OLED display panel 1 by the object is increased, for example, this reduces the thickness of the dielectric layer 15b of the sense capacitor 15, causing an increase in the capacitance Csens of the sense capacitor 15. As understood from the above discussion, it is possible to detect the pressure applied to the OLED display panel 1 by the object through detecting the sense current Isens, which has a current level dependent on the capacitance Csens of the sense capacitor 15.

It may be determined depending on an application of the OLED display panel 1 of this embodiment whether only contact of an object with the OLED display panel 1 is detected or the pressure applied to the OLED display panel 1 by the object is further detected.

The data write operation is then performed after the touch sensing operation. In the data write operation, the second emission line EM2[i] and the scan line SL[i−1] are deactivated and the scan line SL[i] is activated. Meanwhile, a data voltage to be written into the relevant pixel circuit 6 is supplied to the data line DL[j]. The activation of the scan line SL[i] provides a path through which the data line DL[j] is connected to the hold node N$_{HOLD}$ via the select transistor T2, the drive transistor T1 and the threshold voltage compensation transistor T3, and this allows writing the data voltage into the hold capacitor C1. Since the data voltage is written into the hold capacitor C1 via the drive transistor T1 and the threshold voltage compensation transistor T3, a voltage dependent on the threshold voltage V$_{TH}$ of the drive transistor T1 as well as the data voltage is written into the hold capacitor C1, and this effectively achieves threshold voltage compensation. It should be noted that, when threshold voltage compensation is not performed, it is unnecessary to dispose the threshold voltage compensation transistor T3.

The drive operation of the OLED element 14 is then performed after the data write operation. In the drive operation of the OLED element 14, both of the first emission line EM1[i] and the second emission line EM2[i] are activated. This provides a current path which reaches the circuit ground line 33 from the power line 32 via the select transistor T5, the drive transistor T1, the select transistor T6 and the OLED element 14, to drive the OLED element 14. The current which flows through the OLED element 14 depends on the gate potential Vgt1 of the drive transistor T1, that is, the voltage held across the hold capacitor C1, and accordingly the OLED element 14 emits light with a brightness level depending on the data voltage written into the relevant pixel circuit 6.

As thus described, in this embodiment, the sense capacitor 15 used for touch sensing is incorporated in each pixel circuit 6 in the OLED display panel 1. In this configuration, some of circuit elements and routing traces used for drive the OLED element 14 are also used to generate the sense current Isens for touch sensing and this effectively reduces the number of circuit elements and routing traces additionally incorporated in the pixel circuit 6 for achieving touch sensing.

Although the OLED display panel 1 in which all of the pixel circuits 6 includes the sense capacitor 15 has been described in the above, it is not necessary that all of the pixel circuits 6 incorporate a sense capacitor 15. Some but not all of the pixel circuits may incorporate a sense capacitor 15 with such a ratio that sensitivity, resolution and other requirements of touch sensing are fulfilled.

Figure 5:
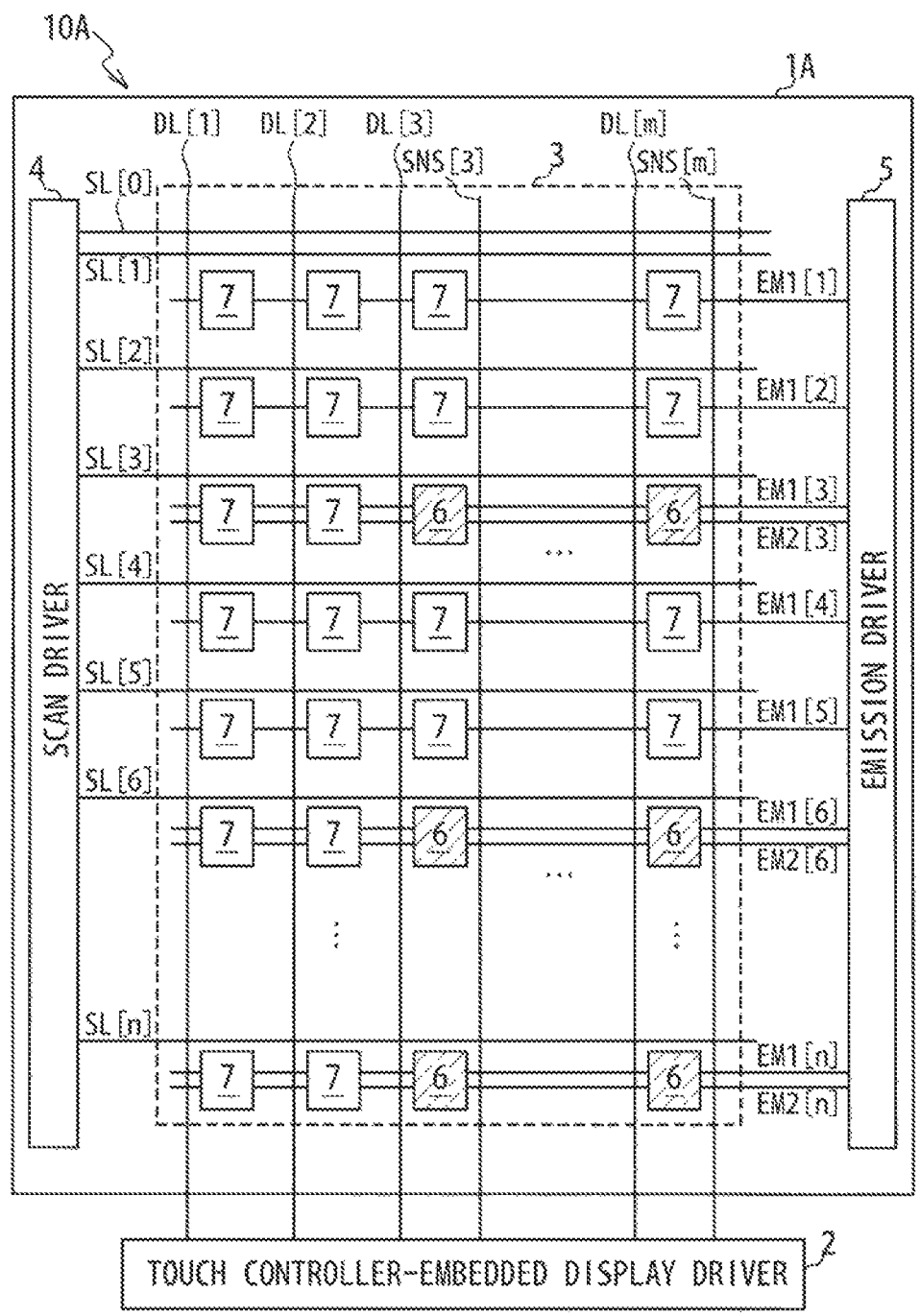
FIG. 5 is a block diagram illustrating the configuration of a panel display device in a modification of the first embodiment.

FIG. 5 is a block diagram illustrating the configuration of a panel display device 10A including an OLED display panel 1A thus configured. In the arrangement illustrated in FIG. 5, pixel circuits 6 which each include a sense capacitor 15 and pixel circuits 7 which do not include a sense capacitor 15 are arrayed in rows and columns in the display region 3. In the arrangement illustrated in FIG. 5, pixel circuit arrays each including pixel circuits arrayed in three rows and three columns are arrayed in rows and columns in the display region 3. In each pixel circuit array, the pixel circuit at the lower right corner is a pixel circuit 6 which includes a sense capacitor 15 and the remaining pixel circuits are pixel circuits 7 which do not include a sense capacitor 15. The pixel circuit 6 which includes the sense capacitor 15 is positioned in the lowermost row of the three-row-three-column pixel circuit array.

Figure 6:
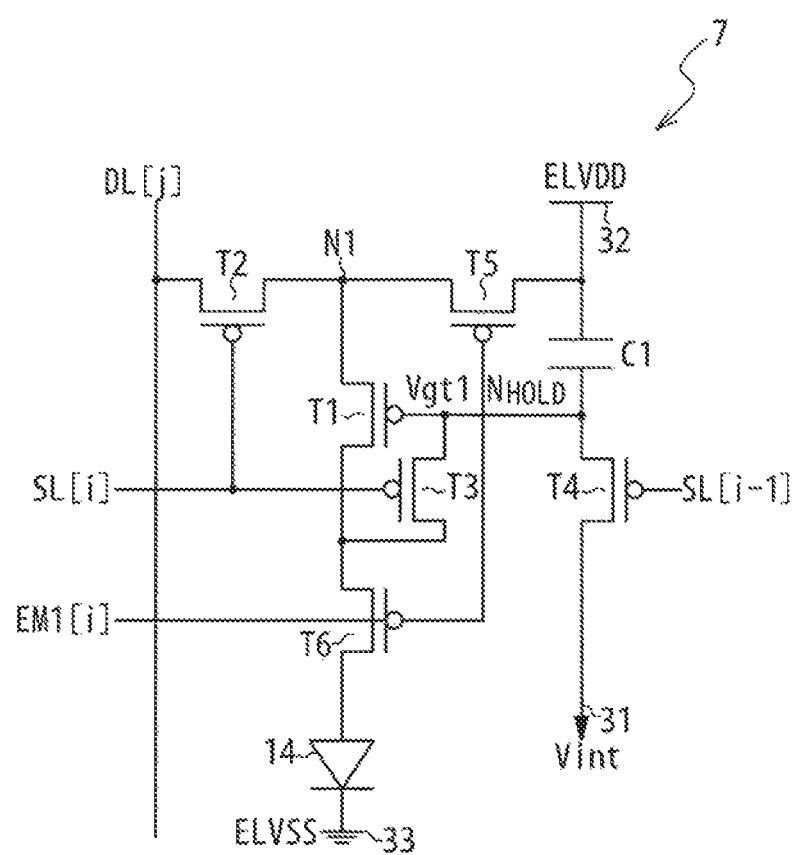
FIG. 6 is a circuit diagram illustrating the circuit configuration of a pixel circuit which does not include a sense capacitor in the panel display device illustrated in FIG. 5.

FIG. 6 is a circuit diagram illustrating one example of the configuration of a pixel circuit 7 which does not include a sense capacitor 15. Illustrated in FIG. 6 is the configuration of the pixel circuit 7 positioned in the $i^{th}$ row and the $j^{th}$ column. The pixel circuit 7 is configured as a so-called 6T1C pixel circuit in this embodiment. The pixel circuit 7 is configured similarly to the pixel circuit 6 illustrated in FIG. 3. The difference is as follows: First, the pixel circuit 7 does not include a select transistor T7 and a sense capacitor 15. Furthermore, the scan line SL[i−2], the second emission line EM2, and the sense line SNS are not connected to the pixel circuit 7. Furthermore, the gate of the reset transistor T4 is connected to the scan line SL[i−1] in place of the scan line SL[i−2]. Finally, the hold capacitor C1 is connected between the hold node $N_{HOLD}$ and the power line 32, to which the power supply voltage ELVDD is supplied.

It should be noted that the operation illustrated in FIG. 4 can properly drive the OLED element 14 in the pixel circuit 7 thus configured.

As understood from the configuration of the pixel circuit 7 illustrated in FIG. 6, unnecessary ones of the lines disposed in the display region 3 in the configuration illustrated in FIG. 1, including the scan lines SL, the first emission lines EM1, the second emission lines EM2 and the sense lines SNS, may be omitted depending on the arrangement of the pixel circuits 7. It is not necessary to dispose second emission lines EM2 along rows of pixel circuits in which only the pixel circuits 7, which do not include a sense capacitor 15, are arranged, and it is not necessary to dispose sense lines SNS along columns of pixel circuits in which only the pixel circuits 7 are arranged. When only the pixel circuits 7 are arranged in the uppermost row of pixel circuits, it is not necessary to dispose the scan line SL[−1].

In the configuration of the OLED display panel 1A illustrated in FIG. 5, second emission lines EM2 are disposed along the rows of the pixel circuits in which pixel circuits 6, which include the sense capacitor 15, are arranged, while second emission lines EM2 are not disposed along the remaining rows. Additionally, sense lines SNS are disposed along the columns of the pixel circuits in which pixel circuits 6 are arranged, while sense lines SNS are not disposed along the remaining columns. Furthermore, the scan line SL[−1] is not disposed.

Although the above-described embodiments disclose the configurations in which the drive transistor T1, the select transistor T2, the threshold voltage compensation transistor T3, the reset transistor T4 and select transistors T5, T6 and T7 are each configured as a P-type MOS transistors, these transistors may be each configured as an N-type MOS transistors. In this case, the power line 32 is grounded and a power line to which the power supply voltage ELVDD is supplied is used in place of the circuit ground line 33. The cathode of the OLED element 14 is connected to the drain of the select transistor T6, and the anode is connected to the power line to which the power supply voltage ELVDD is supplied. Furthermore, the scan lines SL[i−2] to SL[i], the first emission lines EM1[i], the second emission lines EM2[i] are all operated as high-active signal lines.

Second Embodiment

Figure 7:
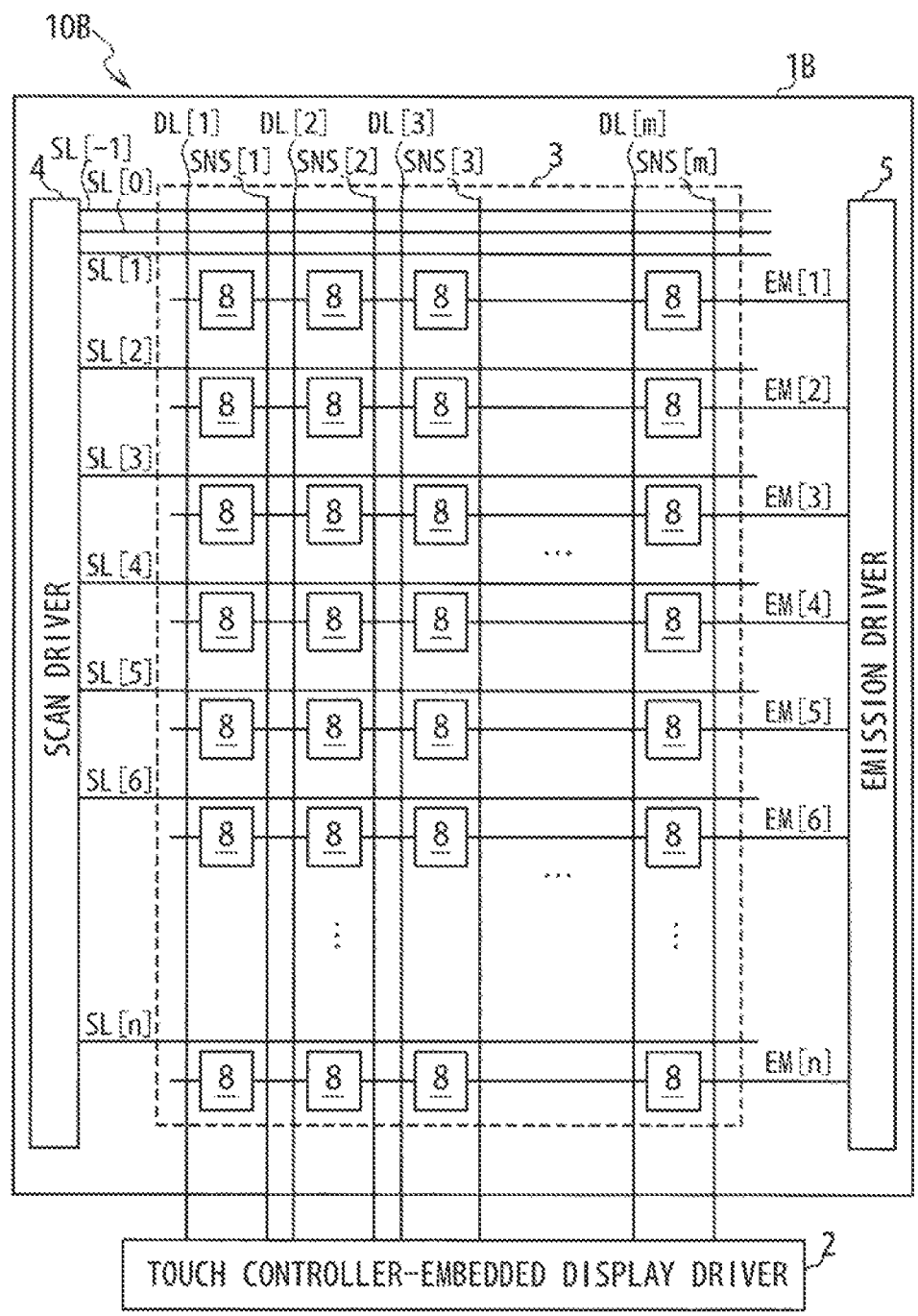
FIG. 7 is a block diagram illustrating the configuration of a panel display device in a second embodiment.

FIG. 7 is a block diagram illustrating the configuration of a panel display device 10B in a second embodiment. The panel display device 10B includes an OLED display panel 1B and a touch controller-embedded display driver 2. The touch controller-embedded display driver 2 has the function of driving the OLED display panel 1B and also performing touch sensing onto the OLED display panel 1B.

The panel display device 10B of the second embodiment is configured similarly to the panel display device 10 of the first embodiment. The difference is as follows: First, pixel circuits 8 configured differently from the pixel circuits 6 and 7 used in the first embodiment are arranged in the OLED display panel 1B. Additionally, each pixel circuit 8 is connected to one emission line EM in the second embodiment, while each pixel circuit 6 is connected to two emission lines, that is, first and second emission lines EM1 and EM2, in the panel display device 10 of the first embodiment. The emission driver 5 drives the emission lines EM[1] to EM[n].

Figure 8:
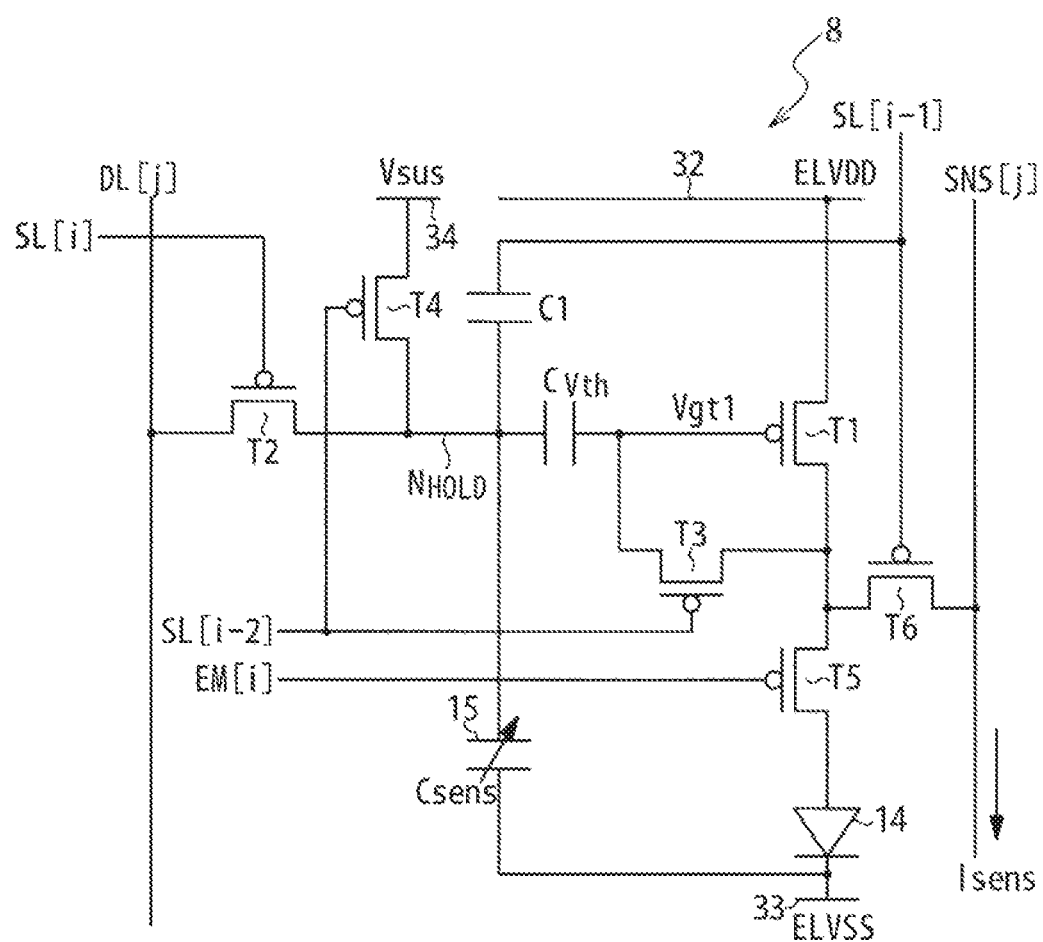
FIG. 8 is a circuit diagram illustrating the circuit configuration of a pixel circuit in a second embodiment.

FIG. 8 is a circuit diagram illustrating the configuration of a pixel circuit 8 in the second embodiment. Although FIG. 8 illustrates the configuration of the pixel circuit 8 positioned in the $i^{th}$ row and the $j^{th}$ column, a person skilled in the art would appreciate other pixel circuits 8 are configured similarly to that illustrated in FIG. 8.

In the second embodiment, each pixel circuit 8 includes an OLED element 14, a sense capacitor 15, a drive transistor T1, a select transistor T2, a threshold voltage compensation transistor T3, a reset transistor T4, a select transistor T5, T6, a hold capacitor C1 and a threshold voltage compensation capacitor $C_{Vth}$. In this embodiment, the drive transistor T1, the select transistor T2, the threshold voltage compensation transistor T3, the reset transistor T4, the select transistor T5 and T6 are each configured as a P-type MOS transistor.

The drive transistor T1 generates a drive current depending on the data voltage written into each pixel circuit 8 and supplies the generated drive current to the OLED element 14. The drive transistor T1 has a source connected to the power line 32 and a gate connected to a hold node $N_{HOLD}$ via the threshold voltage compensation capacitor $C_{Vth}$. The power line 32 is supplied with a power supply voltage ELVDD used to drive the OLED element 14.

The select transistor T2 of each pixel circuit 8 is used to select whether a data voltage is to be written into the pixel circuit 8. The select transistor T2 has a source connected to the data line DL[j], a drain connected to the hold node $N_{HOLD}$ and a gate connected to the scan line SL[i].

The threshold voltage compensation transistor T3 has a source connected to the drain of the drive transistor T1, a drain connected to the gate of the drive transistor T1 and a gate connected to the scan line SL[i−2].

The reset transistor T4 is used to reset the hold capacitor C1, the threshold voltage compensation capacitor $C_{Vth}$ and the sense capacitor 15 by electrically connecting the hold node $N_{HOLD}$ to an internal power line 34 in response to the potential on the scan line SL[i−2]. In this embodiment, the reset transistor T4 has a source connected to the internal power line 34, a drain connected to the hold node $N_{HOLD}$ and a gate connected to the scan line SL[i−2]. The internal power line 34 is fixed to a potential Vsus.

The select transistor T5 is used to select whether the OLED element 14 in the pixel circuit 8 is allowed to emit light. The select transistor T5 has a source connected to the drain of the drive transistor T1, a drain connected to the anode of the OLED element 14 and a gate connected to the emission line EM[i].

The select transistor T6 is used to select whether a sense current Isens is to be obtained from the pixel circuit 8. The select transistor T6 has a source connected to the drain of the drive transistor T1, a drain connected to the sense line SNS[j] and a gate connected to the scan line SL[i−1].

The hold capacitor C1 holds a data voltage corresponding to the grayscale level of the pixel circuit 8, that is, the brightness level with which the OLED element 14 emits light. The hold capacitor C1 is connected between the hold node $N_{HOLD}$ and the scan line SL[i−1].

The threshold voltage compensation capacitor $C_{Vth}$ holds a voltage corresponding to the threshold voltage of the drive transistor T1. The threshold voltage compensation capacitor $C_{Vth}$ is connected between the gate of the drive transistor T1 and the hold node $N_{HOLD}$.

The OLED element 14 has an anode connected to the drain of the select transistor T5 and a cathode connected to a circuit ground line 33. The circuit ground line 33 is a power line fixed to the circuit ground level ELVSS.

The sense capacitor 15 is used to generate a sense signal for touch sensing as described above. The sense capacitor 15 is connected between the hold node $N_{HOLD}$ and the circuit ground line 33.

The configuration of the pixel circuit 8 illustrated in FIG. 8 is such that the select transistor T6, the sense capacitor 15 and the sense line SNS are additionally incorporated in a so-called 5T2C-type pixel circuit. In the configuration illustrated in FIG. 8, some of circuit elements and routing traces used to drive the OLED element 14 are also used to generate the sense signal for touch sensing. This effectively reduces the number of circuit elements and routing traces additionally incorporated in the pixel circuit 8 for achieving touch sensing.

More specifically, the drive transistor T1, which supplies a drive current to the OLED element 14 depending on the data voltage, is also used as an amplifying transistor which generates a sense current Isens used for touch sensing, in response to the capacitance of the sense capacitor 15.

Additionally, the reset transistor T4, which is used to reset the hold capacitor C1 and the threshold voltage compensation capacitor $C_{Vth}$, is also used to reset the sense capacitor 15. More specifically, in the pixel circuit 8 illustrated in FIG. 8, one terminal of the hold capacitor C1, one terminal of the threshold voltage compensation capacitor $C_{Vth}$ and one terminal of the sense capacitor 15 are commonly connected to the hold node $N_{HOLD}$, and the reset transistor T4 is configured to electrically connect the hold node $N_{HOLD}$ to the internal power line 34 in response to the potential on the scan line SL[i−2]. This configuration allows one reset transistor T4 to reset the sense capacitor 15 as well as the hold capacitor C1 and the threshold voltage compensation capacitor $C_{Vth}$.

Furthermore, the hold capacitor C1, which holds the data voltage, is also used as a reference capacitor in the generation of the sense current Isens.

As thus described, the configuration of the pixel circuit 8 in this embodiment allows reducing the number of circuit elements and routing traces additionally incorporated to achieve touch sensing by using circuit elements for both of the drive of the OLED element 14 and the generation of the sense current Isens.

When threshold voltage compensation is not performed, it is unnecessary to dispose the threshold voltage compensation transistor T3 and the threshold voltage compensation capacitor $C_{Vth}$. In this case, the gate of the drive transistor T1 may be directly connected to the hold node $N_{HOLD}$.

Figure 9:
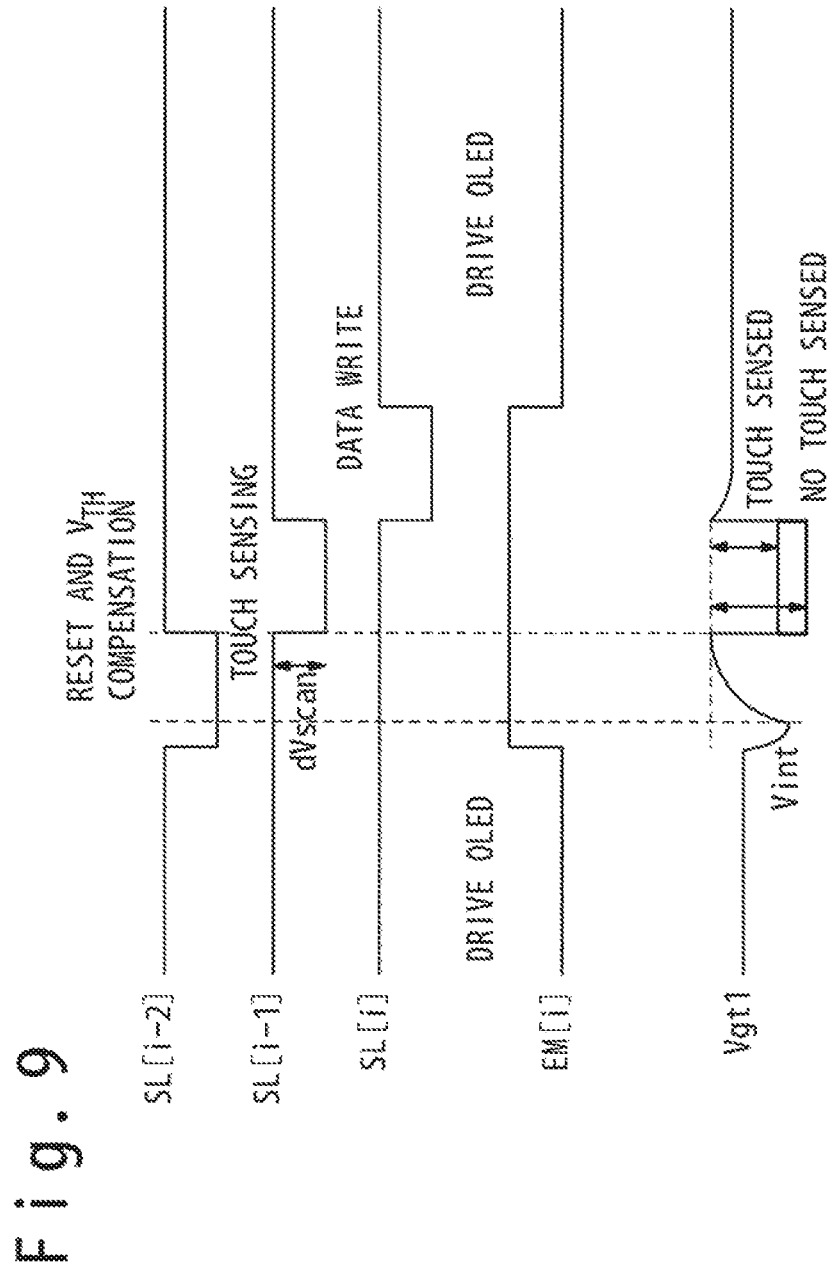
FIG. 9 is a timing chart illustrating the operation of the pixel circuit illustrated in FIG. 8.

FIG. 9 is a timing chart illustrating an exemplary operation of the pixel circuit 8 illustrated in FIG. 8, that is the pixel circuit 8 positioned in the $i^{th}$ row and the $j^{th}$ column. In this embodiment, the scan lines SL[i−2] to SL[i] and the emission line EM[i] are all low-active. In an initial state, the scan lines SL[i−2], SL[i−1] and SL[i] are deactivated, and the emission line EM[i] is activated.

The operation of the pixel circuit 8 illustrated in FIG. 9 includes a reset operation, a threshold voltage compensation operation, a touch sensing operation, a data write operation and a drive operation of the OLED element 14.

In the reset operation, the scan line SL[i−2] is activated. It should be noted that the scan line SL[i−2] is a scan line which is activated when data voltages are written into pixel circuits 6 in the $(i−2)^{th}$ row. The reset transistor T4 is thereby turned on and the hold node $N_{HOLD}$ is reset to the potential Vsus. Meanwhile, the gate potential Vgt1 of the drive transistor T1, which is connected to the hold node $N_{HOLD}$ via the threshold voltage compensation capacitor $C_{Vth}$, varies in accordance with the variation in the potential of the hold node $N_{HOLD}$. The potential Vsus is lower than the minimum data voltage allowed to be written into the pixel circuit 8 and therefore the gate potential Vgt1 of the drive transistor T1 is pulled down to place the drive transistor T1 into the on-state.

The threshold voltage compensation operation is then performed after the reset operation. In the threshold voltage compensation operation, the emission line EM[i] is deactivated with the scan line SL[i−2] activated. Since the drive transistor T1 and the threshold voltage compensation transistor T3 are both placed in the on-state at the moment when the emission line EM[i] is deactivated, the gate of the drive transistor T1 is electrically connected to the power line 32, which is supplied with the power supply voltage ELVDD, and thereby the gate potential Vgt1 of the drive transistor T1 is increased. The drive transistor T1 is thereafter turned off when the potential of the gate of the drive transistor T1 is increased up to a potential which is lower than the power supply voltage ELVDD by the absolute value of the threshold voltage of the drive transistor T1. This allows the threshold voltage compensation capacitor $C_{Vth}$ to hold a voltage corresponding to the threshold voltage of the drive transistor T1.

The touch sensing operation is then performed after the threshold voltage compensation operation. In the touch sensing operation, the scan line SL[i−2] is deactivated and the scan line SL[i−1] is activated. Since the scan line SL[i−1] is low-active and the hold node $N_{HOLD}$ is connected to the scan line SL[i−1] via the hold capacitor C1, the potential of the hold node $N_{HOLD}$ is reduced due to the pull-down of the scan line SL[i−1]. Since the gate of the drive transistor T1 is connected to the hold node $N_{HOLD}$ via the threshold voltage compensation capacitor $C_{Vth}$, the gate potential Vgt1 of the drive transistor T1 is also reduced due to the pull-down of the scan line SL[i−1].

The variation dVsens in the gate potential Vgt1 of the drive transistor T1 upon the activation of the scan line SL[i−1] is dependent on the capacitance Csens of the sense capacitor 15. As is the case with the first embodiment, the variation dVsens in the gate potential Vgt1 of the drive transistor T1 is represented by the following expression (2):

$$dVens = \frac{dVscan \times C1}{(Csens + C1)} \qquad (2)$$

where the dVscan is the variation in the potential on the scan line SL[i−1] upon the activation of the scan line SL[i−1]. This implies the gate potential Vgt1 of the drive transistor T1 upon the activation of the scan line SL[i−1] depends on the capacitance Csens of the sense capacitor 15.

As described in the first embodiment, the capacitance Csens of the sense capacitor 15 depends on contact of an object, such as a human finger, with the OLED display panel 1B in the vicinity of the relevant pixel circuit 6, and accordingly the gate potential Vgt1 of the drive transistor T1 depends on the contact of the object with the OLED display panel 1B. When an object is in contact with the OLED display panel 1B in the vicinity of the relevant pixel circuit 8, this increases the capacitance Csens of the sense capacitor 15. When the sense capacitance Csens of the sense capacitor 15 is increased, the variation dVsens in the gate potential Vgt1 is made relatively small, as indicated by the legend "TOUCH SENSED" in FIG. 9. In contrast, when no object is in contact with the OLED display panel 1B in the vicinity of the relevant pixel circuit 8, the capacitance Csens of the sense capacitor 15 is reduced, and the variation dVsens in the gate potential Vgt1 is made relatively large, as indicated by the legend "NO TOUCH SENSED" in FIG. 9.

Additionally, the select transistor T6 is placed into the on-state in response to the activation of the scan line SL[i−1], and this provides a current path through which the sense current Isens flows from the power line 32 to the sense line SNS[j] via the drive transistor T1 and the select transistor T6. The sense current Isens obtained from the pixel circuit 8 depends on contact of an object, such as a human finger, with the OLED display panel 1B in the vicinity of the pixel circuit 8, since the sense current Isens depends on the gate potential Vgt1 of the drive transistor T1. Accordingly, it is possible to sense contact of an object with the OLED display panel 1B in the vicinity of the pixel circuit 8 by detecting the sense current Isens by the touch controller-embedded display driver 2.

As is the case with the first embodiment, it is possible to detect the pressure applied to the OLED display panel 1B by the object through detecting the sense current Isens, since the capacitance Csens of the sense capacitor 15 depends on the pressure applied to the sense capacitor 15, that is, the pressure applied to the OLED display panel 1 in the vicinity of the sense capacitor. When the pressure applied to the OLED display panel 1B by the object is increased, this reduces the thickness of the dielectric layer 15b of the sense capacitor 15, causing an increase in the capacitance Csens of the sense capacitor 15. As understood from the above discussion, it is possible to detect the pressure applied to the OLED display panel 1B by the object through detecting the sense current Isens, which has a current level dependent on the capacitance Csens of the sense capacitor 15.

It may be determined depending on an application of the OLED display panel 1B whether only contact of an object with the OLED display panel 1B is detected or the pressure applied to the OLED display panel 1B by the object is further detected.

It should be noted that the configuration of the OLED display panel 1B of the second embodiment, in which the threshold voltage compensation operation is performed before the touch sensing operation, effectively reduces influences of variations in the threshold voltage of the drive transistor T1 on the touch sense operation.

The data write operation is then performed after the touch sensing operation. In the data write operation, the scan line SL[i−1] is deactivated and the scan line SL[i] is activated. Meanwhile, a data voltage to be written into the relevant pixel circuit 8 is supplied to the data line DL[j]. The activation of the scan line SL[i] provides a path through which the data line DL[j] is connected to the hold node $N_{HOLD}$ via the select transistor T2, and this allows writing the data voltage into the hold capacitor C1.

The drive operation of the OLED element 14 is then performed after the data write operation. In the drive operation of the OLED element 14, the emission line EM[i] is activated. This provides a current path which reaches the circuit ground line 33 from the power line 32 via the drive transistor T1, the select transistor T5 and the OLED element 14, to drive the OLED element 14. The current flowing through the OLED element 14 depends on the gate potential Vgt1 of the drive transistor T1, which depends on the voltages held across the hold capacitor C1 and the threshold voltage compensation capacitor $C_{Vth}$, and accordingly the OLED element 14 emits light with a brightness level depending on the data voltage written into the relevant pixel circuit 8.

As thus described, the sense capacitor 15 used for touch sensing is incorporated in each pixel circuit 8 in the OLED display panel 1B in this embodiment. In this configuration, circuit elements and routing traces used for drive the OLED element 14 are also used to generate the sense current Isens for touch sensing and this effectively reduces the number of circuit elements and routing traces additionally incorporated in the pixel circuit 8 for achieving touch sensing.

Although the OLED display panel 1B in which all of the pixel circuits 8 include the sense capacitor 15 has been described in the above, it is not necessary that all of the pixel circuits 8 incorporate a sense capacitor 15. Some but not all of the pixel circuits may incorporate a sense capacitor 15 with such a ratio that sensitivity, resolution and other requirements of touch sensing are fulfilled.

Figure 10:
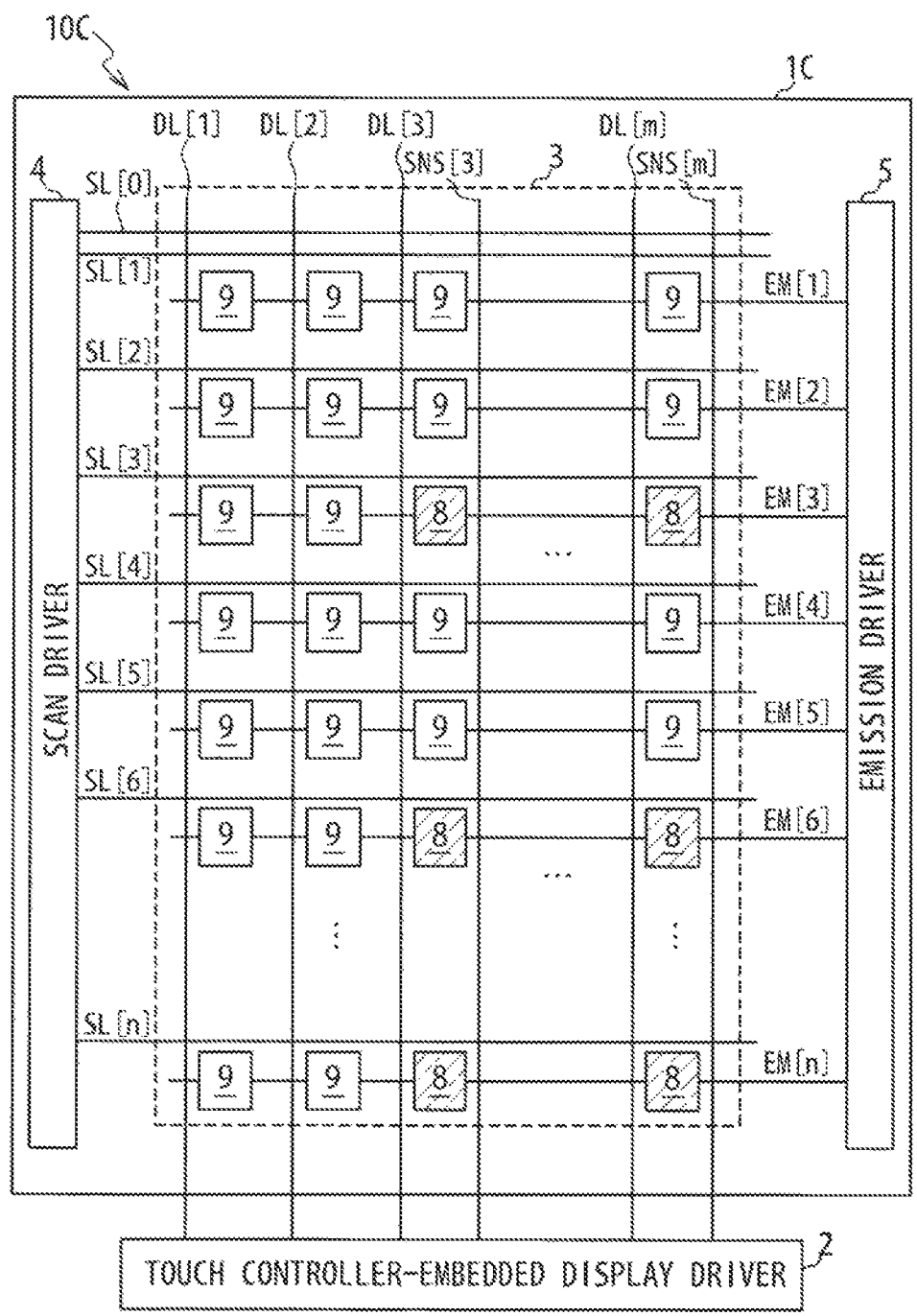
FIG. 10 is a block diagram illustrating the configuration of a panel display device in a modification of the second embodiment.

FIG. 10 is a block diagram illustrating the configuration of a panel display device 10C including an OLED display panel 1C thus configured. In the arrangement illustrated in FIG. 10, pixel circuits 8 which each include a sense capacitor 15 and pixel circuits 9 which do not include a sense capacitor 15 are arrayed in rows and columns in the display region 3. In the arrangement illustrated in FIG. 10, pixel circuit arrays each including pixel circuits arrayed in three rows and three columns are arrayed in rows and columns in the display region 3. In each pixel circuit array, the pixel circuit at the lower right corner is a pixel circuit 8 which includes a sense capacitor 15 and the remaining pixel circuits are pixel circuits 9 which do not include a sense capacitor 15. The pixel circuit 8 which includes the sense capacitor 15 is positioned in the lowermost row of the three-row-three-column pixel circuit array.

Figure 11:
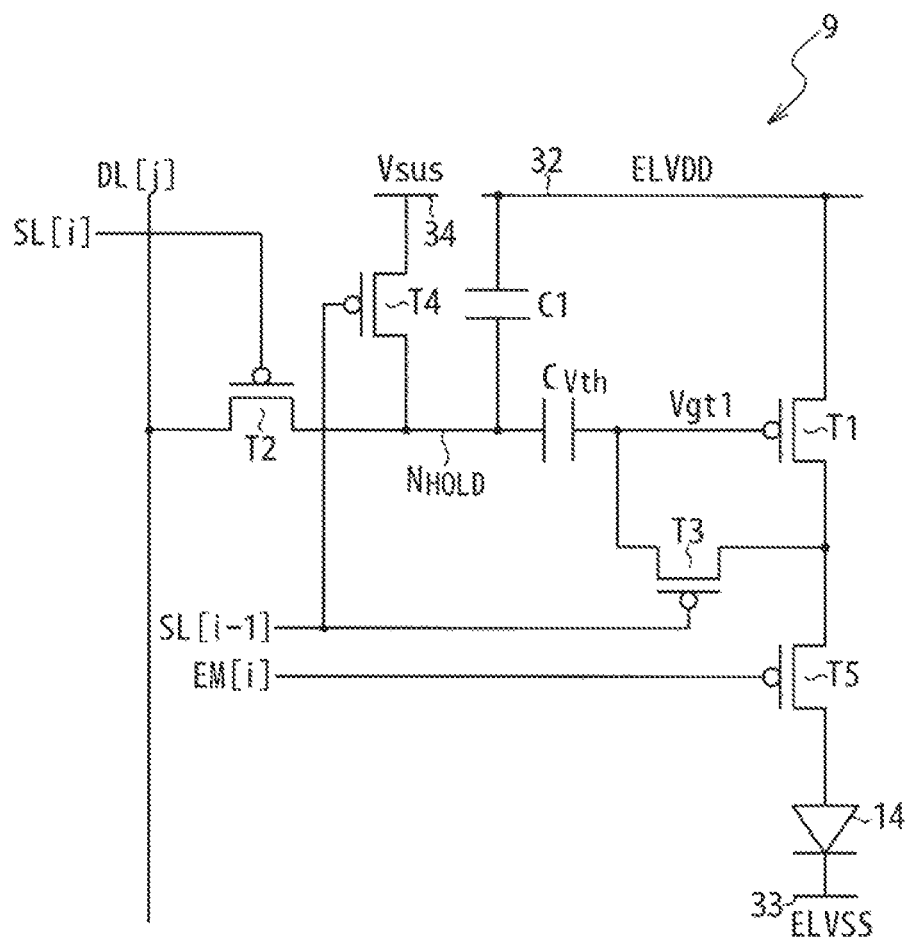
FIG. 11 is a circuit diagram illustrating the circuit configuration of a pixel circuit which does not include a sense capacitor in the panel display device illustrated in FIG. 10.

FIG. 11 is a circuit diagram illustrating one example of the configuration of a pixel circuit 9 which does not include a sense capacitor 15. Illustrated in FIG. 11 is the configuration of the pixel circuit 9 positioned in the $i^{th}$ row and the $j^{th}$ column. The pixel circuit 9 is configured as a so-called 5T2C pixel circuit in this embodiment. The pixel circuit 9 is configured similarly to the pixel circuit 8 illustrated in FIG. 8. The difference is as follows: First, the pixel circuit 9 does not include a select transistor T6 and a sense capacitor 15. Furthermore, the scan line SL[i−2] and the sense line SNS are not connected to the pixel circuit 9, which does not include a sense capacitor 15. Furthermore, the gate of the reset transistor T4 is connected to the scan line SL[i−1], in place of the scan line SL[i−2]. Finally, the hold capacitor C1 is connected between the hold node $N_{HOLD}$ and the power line 32, to which the power supply voltage ELVDD is supplied.

It should be noted that the operation illustrated in FIG. 9 can properly drive the OLED element 14 in the pixel circuit 9 thus configured.

As understood from the configuration of the pixel circuit 9 illustrated in FIG. 11, unnecessary ones of the lines disposed in the display region 3 in the configuration illustrated in FIG. 7, including the scan lines SL, the emission lines EM, and the sense lines SNS, may be omitted depending on the arrangement of the pixel circuits 9. It is not necessary to dispose sense lines SNS along columns of pixel circuits in which only the pixel circuits 9 are arranged. When only the pixel circuits 9, which do not include a sense capacitor 15, are arranged in the uppermost row of pixel circuits, it is not necessary to dispose the scan line SL[−1]. In the configuration of the OLED display panel 1C illustrated in FIG. 10, sense lines SNS are disposed along the columns of the pixel circuits in which pixel circuits 8 are arranged, and sense lines SNS are not disposed along the remaining columns. Furthermore, the scan line SL[−1] is not disposed.

Although the above-described embodiments disclose the configurations in which the drive transistor T1, the select transistor T2, the threshold voltage compensation transistor T3, the reset transistor T4 and select transistors T5 and T6 are each configured as a P-type MOS transistors, these transistors may be each configured as an N-type MOS transistors. In this case, the power line 32 is grounded and a power line to which the power supply voltage ELVDD is supplied is used in place of the circuit ground line 33. The cathode of the OLED element 14 is connected to the drain of the select transistor T6, and the anode is connected to the power line to which the power supply voltage ELVDD is supplied. Furthermore, the scan lines SL[i−2] to SL[i] and the emission lines EM[i] are all operated as high-active signal lines.

Although embodiments of the present disclosure have been specifically described, it would be understood by a person skilled in the art that the techniques disclosed in the present disclosure may be implemented with various modifications.

For example, although the OLED elements 14 are integrated in the respective pixel circuits 6 to 9 in the above-described embodiments, the techniques disclosed in the present disclosure are applicable to current-drive display panels in which other current-driven elements, such as LED elements formed of inorganic materials, may be integrated in the respective pixel circuits 6 to 9 in place of the OLED elements 14.

What is claimed is:

1. A display panel, comprising:
   a sense line; and
   a plurality of pixel circuits comprising a touch sensing-adapted pixel circuit comprising:
     a hold capacitor configured to hold a voltage corresponding to a data voltage;
     a sense capacitor having a capacitance that varies responsive to contact of an object with the display panel in a vicinity of the touch sensing-adapted pixel circuit;
     a current-driven element; and
     a drive transistor configured to:
       supply a drive current to the current-driven element responsive to the data voltage; and
       supply a sense current to the sense line responsive to the capacitance.

2. The display panel according to claim 1, wherein the plurality of pixel circuits are arranged in a plurality of rows, wherein the display panel further comprises:
   a first scan line;
   a second scan line; and
   a third scan line,
   wherein the touch sensing-adapted pixel circuit is positioned in a first row of the plurality of rows,
   wherein the touch sensing-adapted pixel circuit further comprises a reset transistor,
   wherein the hold capacitor is connected between a hold node and the second scan line,
   wherein the sense capacitor is connected between the hold node and a circuit ground line, and
   wherein the reset transistor is configured to electrically connect the hold node to a first power line fixed to a first given potential in response to a potential on the third scan line.

3. The display panel according to claim 2, wherein the first scan line is activated when data voltages are written into the pixel circuits positioned in the first row,
   wherein the second scan line is activated when data voltages are written into pixel circuits positioned in a second row adjacent to the first row of the plurality of rows, data voltages being written into the pixel circuits positioned in the second row before the data voltages are written into the pixel circuits positioned in the first row, and
   wherein the third scan line is activated when data voltages are written into pixel circuits positioned in a third row adjacent to the second row of the plurality of rows, data voltages being written into the pixel circuits positioned in the third row before the data voltages are written into the pixel circuits positioned in the second row.

4. The display panel according to claim 2, further comprising:
   a first emission line;
   a second emission line; and
   a data line,
   wherein a gate of the drive transistor is connected to the hold node,
   wherein the touch sensing-adapted pixel circuit further comprises:
     a first select transistor configured to electrically connect the data line to a source of the drive transistor in response to a potential on the first scan line;
     a second select transistor configured to electrically connect a second power line fixed to a second given potential to the source of the drive transistor;

a third select transistor configured to electrically connect a drain of the drive transistor to the current-driven element in response to a potential on the first emission line; and a fourth select transistor configured to electrically connect the drain of the drive transistor to the sense line in response to a potential on the second scan line.

5. The display panel according to claim 4, wherein the touch sensing-adapted pixel circuit further comprises:

a threshold voltage compensation transistor configured to electrically connect the drain of the drive transistor to the gate of the drive transistor in response to the potential on the first scan line.

6. The display panel according to claim 2, further comprising:

an emission line; and a data line, wherein the touch sensing-adapted pixel circuit further comprises:

a threshold voltage compensation capacitor connected between the hold node and a gate of the drive transistor;

a first select transistor configured to electrically connect the data line to the hold node in response to a potential on the first scan line;

a second select transistor configured to electrically connect a drain of the drive transistor to the current-driven element in response to a potential on the emission line;

a third select transistor configured to electrically connect the drain of the drive transistor to the sense line in response to a potential of the second scan line; and a threshold voltage compensation transistor configured to electrically connect the drain of the drive transistor to the gate of the drive transistor in response to a potential on the third scan line.

7. The display panel according to claim 1, wherein the sense capacitor comprises:

a first electrode;

a second electrode; and a dielectric layer disposed between the first electrode and the second electrode, wherein the sense capacitor is configured so that a distance between the first electrode and the second electrode varies depending on a pressure applied to the display panel in a vicinity of the sense capacitor, in at least a portion of the sense capacitor.

8. The display panel according to claim 7, wherein the dielectric layer is formed of organic dielectric material having elasticity.

9. A panel display device, comprising:

a display driver configured to generate a data voltage, and to receive a sense current; and a display panel comprising:

a sense line; and a plurality of pixel circuits comprising a touch sensing-adapted pixel circuit comprising:

a hold capacitor configured to hold a voltage corresponding to a data voltage;

a sense capacitor having a capacitance that varies responsive to contact of an object with the display panel in a vicinity of the touch sensing-adapted pixel circuit;

a current-driven element; and a drive transistor configured to:

supply a drive current to the current-driven element responsive to the data voltage; and supply the sense current to the sense line responsive to the capacitance.

10. The panel display device according to claim 9, wherein the plurality of pixel circuits are arranged in a plurality of rows, wherein the display panel further comprises:

a first scan line;

a second scan line; and a third scan line, wherein the touch sensing-adapted pixel circuit is positioned in a first row of the plurality of rows, wherein the touch sensing-adapted pixel circuit further comprises a reset transistor, wherein the hold capacitor is connected between a hold node and the second scan line, wherein the sense capacitor is connected between the hold node and a circuit ground line, and wherein the reset transistor is configured to electrically connect the hold node to a first power line fixed to a first given potential in response to a potential on the third scan line.

11. The panel display device according to claim 10, wherein the first scan line is activated when data voltages are written into the pixel circuits positioned in the first row, wherein the second scan line is activated when data voltages are written into pixel circuits positioned in a second row adjacent to the first row of the plurality of rows, data voltages being written the pixel circuits positioned in the second row before the data voltages are written into the pixel circuits positioned in the first row, and wherein the third scan line is activated when data voltages are written into pixel circuits positioned in a third row adjacent to the second row of the plurality of rows, data voltages being written the pixel circuits positioned in the third row before the data voltages are written into the pixel circuits positioned in the second row.

12. The panel display device according to claim 10, further comprising:

a first emission line;

a second emission line; and a data line, wherein a gate of the drive transistor is connected to the hold node, wherein the touch sensing-adapted pixel circuit further comprises:

a first select transistor configured to electrically connect the data line to a source of the drive transistor in response to a potential on the first scan line;

a second select transistor configured to electrically connect a second power line fixed to a second given potential to the source of the drive transistor;

a third select transistor configured to electrically connect a drain of the drive transistor to the current-driven element in response to a potential on the first emission line; and a fourth select transistor configured to electrically connect the drain of the drive transistor to the sense line in response to a potential on the second scan line.

13. The panel display device according to claim 12, wherein the touch sensing-adapted pixel circuit further comprises:

a threshold voltage compensation transistor configured to electrically connect the drain of the drive transistor to the gate of the drive transistor in response to the potential on the first scan line.

14. The panel display device according to claim 10, further comprising:
an emission line; and
a data line,
wherein the touch sensing-adapted pixel circuit further comprises:
a threshold voltage compensation capacitor connected between the hold node and a gate of the drive transistor;
a first select transistor configured to electrically connect the data line to the hold node in response to a potential on the first scan line;
a second select transistor configured to electrically connect a drain of the drive transistor to the current-driven element in response to a potential on the emission line;
a third select transistor configured to electrically connect the drain of the drive transistor to the sense line in response to a potential of the second scan line; and
a threshold voltage compensation transistor configured to electrically connect the drain of the drive transistor to the gate of the drive transistor in response to a potential on the third scan line.

15. The panel display device, according to claim 9, wherein the sense capacitor comprises:
a first electrode;
a second electrode; and
a dielectric layer disposed between the first electrode and the second electrode,
wherein the sense capacitor is configured so that a distance between the first electrode and the second electrode varies depending on a pressure applied to the display panel in a vicinity of the sense capacitor, in at least a portion of the sense capacitor, and
wherein the display driver is configured to detect the pressure applied to the display panel based on the sense current.

16. The panel display device according to claim 15, wherein the dielectric layer is formed of organic dielectric material having elasticity.

17. A method, comprising:
supplying, using a drive transistor of a pixel circuit of a display panel, a drive current to a current-driven element of the pixel circuit in responsive to a voltage held across a hold capacitor of the pixel circuit; and
supplying, using the drive transistor, a sense current to a sense line responsive to a capacitance of a sense capacitor,
wherein the capacitance varies responsive to contact of an object with the display panel in a vicinity of the pixel circuit.

18. The method according to claim 17, further comprising:
by a reset transistor integrated in the pixel circuit of the display panel, setting a gate of the drive transistor to a given potential,
wherein the hold capacitor and the sense capacitor are commonly connected to the gate of the drive transistor.

19. The method according to claim 18, further comprising:
supplying a drive voltage to a source of the drive transistor while the drive transistor is in a state in which a drain and the gate of the drive transistor are electrically connected, to generate the voltage held across the hold capacitor.

20. The method according to claim 17, further comprising:
by a reset transistor integrated in the pixel circuit, setting a hold node to a given potential while the drive transistor is in a state in which a drain and a gate of the drive transistor are electrically connected,
wherein the sense capacitor is connected to the hold node,
wherein a threshold voltage compensation capacitor is connected between the hold node and the gate of the drive transistor, and
wherein the drive current and the sense current depend on a voltage held across the threshold voltage compensation.

* * * * *

UNITED STATES PATENT AND TRADEMARK OFFICE
CERTIFICATE OF CORRECTION

PATENT NO. : 10,503,335 B2
APPLICATION NO. : 15/922239
DATED : December 10, 2019
INVENTOR(S) : Seiki Takahashi Page 1 of 1

It is certified that error appears in the above-identified patent and that said Letters Patent is hereby corrected as shown below:

In the Claims

On Column 20, Line 4, In Claim 17, after "circuit" delete "in".

Signed and Sealed this
Twenty-fourth Day of November, 2020

Andrei Iancu
*Director of the United States Patent and Trademark Office*